United States Patent
Yamada et al.

(10) Patent No.: US 11,613,601 B2
(45) Date of Patent: Mar. 28, 2023

(54) HETEROPHASIC PROPYLENE POLYMER MATERIAL AND PROPYLENE-BASED RESIN COMPOSITION

(71) Applicant: SUMITOMO CHEMICAL COMPANY, LIMITED, Tokyo (JP)

(72) Inventors: Hidekazu Yamada, Chiba (JP); Masahiro Yanagisawa, Chiba (JP)

(73) Assignee: SUMITOMO CHEMICAL COMPANY, LIMITED, Tokyo (JP)

( * ) Notice: Subject to any disclaimer, the term of this patent is extended or adjusted under 35 U.S.C. 154(b) by 0 days.

(21) Appl. No.: 16/493,562

(22) PCT Filed: Mar. 12, 2018

(86) PCT No.: PCT/JP2018/009486
§ 371 (c)(1),
(2) Date: Sep. 12, 2019

(87) PCT Pub. No.: WO2018/168760
PCT Pub. Date: Sep. 20, 2018

(65) Prior Publication Data
US 2020/0010599 A1    Jan. 9, 2020

(30) Foreign Application Priority Data
Mar. 14, 2017  (JP) ............................. JP2017-048151

(51) Int. Cl.
*C08F 297/08* (2006.01)
*C08K 3/34* (2006.01)
*C08L 23/10* (2006.01)

(52) U.S. Cl.
CPC ............ *C08F 297/083* (2013.01); *C08K 3/34* (2013.01); *C08L 23/10* (2013.01); *C08L 2207/02* (2013.01)

(58) Field of Classification Search
CPC .................................................. C08F 297/083
See application file for complete search history.

(56) References Cited

U.S. PATENT DOCUMENTS 6,472,477 B2   10/2002  Kanzaki et al.
6,593,409 B2    7/2003  Ohkawa et al.
(Continued)

FOREIGN PATENT DOCUMENTS

EP    2275485 A1    1/2011
JP    H07286022 A   10/1995
(Continued)

OTHER PUBLICATIONS

International Search Report and Written Opinion in PCT/JP2018/009486. dated Jun. 12, 2018.
(Continued)

*Primary Examiner* — Arrie L Reuther
(74) *Attorney, Agent, or Firm* — Meunier Carlin & Curfman LCC

(57) ABSTRACT

A heterophasic propylene polymerization material, including a propylene polymer component (I) and an ethylene-α-olefin copolymer component (II), the heterophasic propylene polymerization material satisfying features (i) to (v): (i) the heterophasic propylene polymerization material contains a xylene-soluble content by 20 wt % or more; (ii) xylene-soluble content in the heterophasic propylene polymerization material has a limiting viscosity $[\eta]_{CXS}$ not less than 5 dL/g; (iii) a melt flow rate of the propylene polymer component (I) is 70 g/10 min or more; (iv) MFR of the heterophasic propylene polymerization material is not less than 5 g/10 min; and (v) the number of gels of 100 μm or more in diameter on a sheet for counting gels, including the heterophasic propylene polymerization material, is 1000 or less per 100 cm² of the sheet.

2 Claims, 1 Drawing Sheet

(56) References Cited

U.S. PATENT DOCUMENTS

| | | |
|---|---|---|
| 9,309,394 B2 | 4/2016 | Ciarafoni et al. |
| 2002/0035209 A1 | 3/2002 | Kanzaki et al. |
| 2008/0161474 A1 | 7/2008 | Shimouse et al. |
| 2009/0131576 A1 | 5/2009 | Zanka et al. |
| 2009/0292060 A1 | 11/2009 | Suzuki et al. |
| 2015/0299443 A1 | 10/2015 | Tranninger et al. |
| 2016/0137831 A1 | 5/2016 | Hosoi et al. |
| 2016/0304709 A1 | 10/2016 | Tranninger et al. |

FOREIGN PATENT DOCUMENTS

| | | |
|---|---|---|
| JP | 11-322871 | 10/1998 |
| JP | 200212734 A | 6/2000 |
| JP | 2009007394 | 6/2007 |
| JP | 2011190408 A | 9/2011 |
| JP | 2011195661 A | 10/2011 |
| JP | 2013523900 A | 6/2013 |
| JP | 2019506002 A | 2/2019 |
| WO | 2011117032 A1 | 9/2011 |
| WO | 2015100374 A2 | 7/2015 |

OTHER PUBLICATIONS

Search Report issued in EP Application No. 18767941; dated Oct. 23, 2020; 8 pages.
Office Action issued in JP application No. 2019-506002; dated Aug. 2, 2021; 7 pages.
The Japan Society for Analytical Chemistry, Research Committee of Polymer Analysis, 1995.

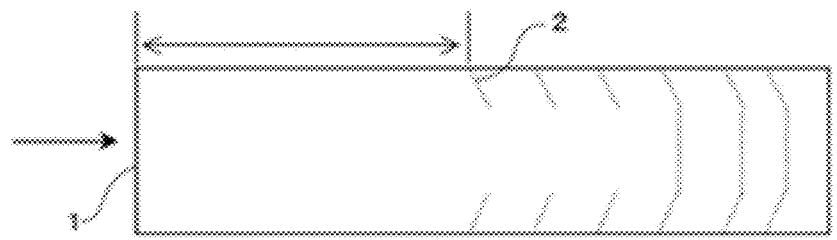

HETEROPHASIC PROPYLENE POLYMER MATERIAL AND PROPYLENE-BASED RESIN COMPOSITION

TECHNICAL FIELD

The present invention relates to a heterophasic propylene polymerization material and a propylene-based resin composition.

BACKGROUND ART

Polypropylene-based resins have been used as automobile raw materials. Large-size injection-molded products for automobile members such as bumpers and instrument panels are sometimes defective with appearance defects called "flow marks". The flow marks are a molding defective phenomenon in which strip patterns appear on a surface of injection-molded products. For example, Patent Document 1 discloses that occurrence of flow marks can be suppressed by adding to a propylene-based material a heterophasic propylene polymerization material including an ethylene-propylene copolymer having a high molecular weight.

PRIOR ART DOCUMENTS

Patent Documents

Patent Document 1: JP-A-2015-25124

SUMMARY OF THE INVENTION

Problems to be Solved by the Invention

However, molded products produced from a resin composition including such a heterophasic propylene polymerization material has been associated with such a drawback that polymer aggregates called gels likely occur.

An object of the present invention is to provide a heterophasic propylene polymerization material, which, when added to a propylene-based resin, can make it possible to reduce a flow-mark occurring area on a surface of a propylene-based resin injection-molded product and decrease the number of gels occurring in the product thus produced.

Means for Solving the Problems

The present invention provides the following [1] to [7].

[1] A heterophasic propylene polymerization material, including a component (I-1) or (I-2), and a component (II), the heterophasic propylene polymerization material satisfying features (i) to (v):

(i) the heterophasic propylene polymerization material contains a xylene-soluble content by 20 wt % or more, provided that a total weight of the heterophasic propylene polymerization material is 100 wt %);

(ii) xylene-soluble content in the heterophasic propylene polymerization material has a limiting viscosity $[\eta]_{CXS}$ not less than 5 dL/g;

(iii) a melt flow rate of the component (I-1) or (I-2) is 70 g/10 min or more, where the melt flow rate is measured at 230° C. under load of 2.16 kgf;

(iv) a melt flow rate of the heterophasic propylene polymerization material is 5 g/10 min or more, where the melt flow rate is measured at 230° C. under load of 2.16 kgf; and (v) The number of gels of 100 μm or more in diameter on a sheet for counting gels is 1000 or less per 100 cm² of the sheet, where the sheet is prepared by mixing 0.05 parts by weight of a neutralizer and 0.2 parts by weight of an anti-oxidant with 100 parts by weight of the heterophasic propylene polymerization material, so as to obtain a mixture, pelletizing the mixture by melt-extrusion at a setting temperature of 280° C. and an extrusion rate of 10 kg/hr by using a 40 mm granulator equipped with a screen pack of 100 mesh, so as to obtain pellets, melt-extruding the pellets thus obtained at a resin temperature of 230° C. into a sheet shape by using a single-screwed extruder with a screw diameter of 20 mm, so as to obtain a sheet-shaped product thus melt-extruded, and cooling the sheet shaped product on a cooling roll through which cooling water of 30° C. is passed, so as to obtain the sheet of 50 μm in thickness, the component (I-1) being a propylene homopolymer, the component (I-2) being a propylene copolymer containing a monomer unit derived from propylene, and a monomer unit derived from at least one olefin selected from the group consisting of ethylene and α-olefins having 4 to 12 carbon atoms, the component (I-2) containing the monomer unit derived from at least one olefin selected from the group consisting of ethylene and α-olefins having 4 to 12 carbon atoms, by an amount not less than 0.01 wt % but less than 20 wt %, where a total weight of the component (I-2) is 100 wt %, and the component (II) being an ethylene-α-olefin copolymer containing a monomer unit derived from ethylene and a monomer unit derived from at least one olefin selected from the group consisting of propylene and α-olefins having 4 to 12 carbon atoms, the component (II) containing the monomer unit derived from ethylene by not less than 20 wt % but not more than 80 wt %, provided that a total weight of the component (II) is 100 wt %.

[2] The heterophasic propylene polymerization material according to [1], including phthalic ester by 10 ppm or less.

[3] A polypropylene modifier including, as an active constituent, the heterophasic propylene polymerization material according to [1] or [2].

[4] Use of the heterophasic propylene polymerization material according to [1] or [2] as a polypropylene modifier.

[5] Use of the heterophasic propylene polymerization material according to [1] or [2] for reducing occurrence of flow marks on a propylene-based resin injection-molded product.

[6] A propylene-based resin composition including the heterophasic propylene polymerization material according to [1] or [2], a component (A), a component (B), and a component (C), the propylene-based resin composition containing the heterophasic propylene polymerization material by 1 to 10 wt %, the component (A) by 30 to 97 wt %, the component (B) by 1 to 30 wt %, and the component (C) by 1 to 30 wt %, where a sum of the heterophasic propylene polymerization material, the component (A), the component (B), and the component (C) is 100 wt %, the component (A) being a propylene-based polymer, the component (B) being an olefin-based elastomer, and the component (C) being an inorganic filler.

[7] A polypropylene modifier including, as an active constituent, a heterophasic propylene polymerization material including a component (I-1) or (I-2), and a component (II), the heterophasic propylene polymerization material satisfying features (i) to (iv) and the polypropylene modifier satisfying a feature (v):

(i) the heterophasic propylene polymerization material contains a xylene-soluble content by 20 wt % or more, provided that a total weight of the heterophasic propylene polymerization material is 100 wt %;

(ii) xylene-soluble content in the heterophasic propylene polymerization material has a limiting viscosity $[\eta]_{CXS}$ not less than 5 dL/g;

(iii) a melt flow rate of the component (I-1) or (I-2) is 70 g/10 min or more, where the melt flow rate is measured at 230° C. under load of 2.16 kgf;

(iv) a melt flow rate of the heterophasic propylene polymerization material is 5 g/10 min or more, where the melt flow rate is measured at 230° C. under load of 2.16 kgf; and (v) the number of gels of 100 μm or more in diameter on a sheet for counting gels is 1000 or less per 100 cm$^2$ of the sheet, where the sheet is prepared by pelletizing the polypropylene modifier by melt-extrusion at a setting temperature of 280° C. and an extrusion rate of 10 kg/hr by using a 40 mm granulator equipped with a screen pack of 100 mesh, so as to obtain pellets, melt-extruding the pellets thus obtained at a resin temperature of 230° C. into a sheet shape by using a single-screwed extruder with a screw diameter of 20 mm, so as to obtain a sheet-shaped product thus melt-extruded, and cooling the sheet shaped product on a cooling roll through which cooling water of 30° C. is passed, so as to obtain the sheet of 50 μm in thickness, the component (I-1) being a propylene homopolymer, the component (I-2) being a propylene copolymer component containing a monomer unit derived from propylene, and a monomer unit derived from at least one olefin selected from the group consisting of ethylene and α-olefins having 4 to 12 carbon atoms, the component (I-2) containing the monomer unit derived from at least one olefin selected from the group consisting of ethylene and α-olefins having 4 to 12 carbon atoms, by an amount not less than 0.01 wt % but less than 20 wt %, where a total weight of the component (I-2) is 100 wt %, and the component (II) being an ethylene-α-olefin copolymer component containing a monomer unit derived from ethylene and a monomer unit derived from at least one olefin selected from the group consisting of propylene and α-olefins having 4 to 12 carbon atoms, the component (II) containing the monomer unit derived from ethylene by not less than 20 wt % but not more than 80 wt %, provided that a total weight of the component (II) is 100 wt %.

Effect of the Invention

When added to a propylene-based resin, a heterophasic propylene polymerization material according to the present invention can make it possible to reduce a flow-mark occurring area on a propylene-based resin injection-molded product and decrease the number of gels occurring in the product containing the propylene-based resin composition.

BRIEF DESCRIPTION OF THE DRAWINGS

FIG. 1 is a view for illustrating a flow-mark occurring starting position.

MODE FOR CARRYING OUT THE INVENTION

In this Description, melt flow rates (hereinafter, may be abbreviated as MFR) are/were measured at a temperature of 230° C. under a load of 2.16 kgf according to a method stipulated under JIS K7210 A.

<Heterophasic Propylene Polymerization Material>

A heterophasic propylene polymerization material according to the present invention is a heterophasic propylene polymerization material including a component (I-1) or (I-2), and a component (II). The component (I-1) and the component (I-2) are collectively referred to as a "component (I)".

The component (I-1) is a homopolymer component only including a monomer unit derived from propylene.

The component (I-2) is a propylene copolymer component containing a monomer unit derived from propylene, and a monomer unit derived from at least one olefin selected from the group consisting of ethylene and α-olefins having 4 to 12 carbon atoms.

The component (I-2) contains the monomer unit derived from at least one olefin selected from the group consisting of ethylene and α-olefins having 4 to 12 carbon atoms, by an amount not less than 0.01 wt % but less than 20 wt %, preferably not less than 0.1 wt % but not more than 15 wt %, more preferably not less than 0.1 wt % but less than 15 wt %, further more preferably not less than 1 wt % but not more than 10 wt %, or especially preferably not less than 1 wt % but less than 10 wt %, provided that a total weight of the component (I-2) is 100 wt %.

Examples of the component (I-2) include:

(1) a propylene-ethylene copolymer containing a monomer unit derived from propylene by an amount not less than 85 wt % but less than 100 wt %, and a monomer unit derived from ethylene by an amount more than 0 wt % but not more than 15 wt %, provided that a sum of the monomer unit derived from propylene and the monomer unit derived from ethylene is 100 wt %;

(2) a propylene-ethylene copolymer containing a monomer unit derived from propylene by an amount not less than 85 wt % but not more than 99.99 wt %, and a monomer unit derived from ethylene by an amount not less than 0.01 wt % but not more than 15 wt %, provided that a sum of the monomer unit derived from propylene and the monomer unit derived from ethylene is 100 wt %;

(3) a propylene-ethylene-α-olefin copolymer containing a monomer derived from propylene by an amount not less than 80 wt % but less than 100 wt %, a monomer unit derived from ethylene by an amount more than 0 wt % but not more than 10 wt %, and a monomer unit derived from a α-olefin having 4 to 12 carbon atoms by an amount more than 0 wt % but not more than 10 wt %, provided that a sum of the monomer unit derived from propylene, the monomer unit derived from ethylene, and the monomer unit derived from the α-olefin having 4 to 12 carbon atoms is 100 wt %;

(4) a propylene-ethylene-α-olefin copolymer containing a monomer derived from propylene by an amount not less than 80 wt % but not more than 99.99 wt %, a monomer unit derived from ethylene by an amount not less than 0.01 wt % but not more than 10 wt %, and a monomer unit derived from a α-olefin having 4 to 12 carbon atoms by an amount more than 0.01 wt % but not more than 10 wt %, provided that a sum of the monomer unit derived from propylene, the monomer unit derived from ethylene, and the monomer unit derived from the α-olefin having 4 to 12 carbon atoms is 100 wt %);

(5) a propylene-α-olefin copolymer containing a monomer derived from propylene by an amount not less than 85 wt % but less than 100 wt %, and a monomer unit derived from a α-olefin having 4 to 12 carbon atoms by an amount more than 0 wt % but not more than 15 wt %, provided that a sum of the monomer unit derived from propylene, and the monomer unit derived from the α-olefin having 4 to 12 carbon atoms is 100 wt %; and (6) a propylene-α-olefin copolymer containing a monomer derived from propylene by an amount not less than 85 wt % but less than 99.99 wt %, and a monomer unit derived from a α-olefin having 4 to 12 carbon atoms by an amount not less than 0.01 wt % but not more than 15 wt %, provided that a sum of the monomer unit derived from propylene, and the monomer unit derived from the α-olefin having 4 to 12 carbon atoms is 100 wt %.

The component (II) is an ethylene-α-olefin copolymer component containing a monomer unit derived from ethylene and a monomer unit derived from at least one olefin selected from the group consisting of propylene and α-olefins having 4 to 12 carbon atoms.

The component (II) contains the monomer unit derived ethylene by an amount not less than 20 wt % but not more than 80 wt %, preferably not less than 20 wt % but not more than 75 wt %, more preferably not less than 20 wt % but not more than 60 wt %, or further more preferably not less than 25 wt % but not more than 50 wt %, provided that the total amount of the component (II) is 100 wt %.

Examples of the α-olefins having 4 to 12 carbon atoms usable in the component (I-2) or the component (II) include 1-butene, 1-pentene, 1-hexene, 1-heptene, 1-octene, 1-nonene, 1-decene, 3-methyl-1-butene, 3-methyl-1-pentene, 4-methyl-1-pentene, 2-ethyl-1-hexene, and 2,2,4-trimethyl-1-pentene. It is preferable that the α-olefin having 4 to 12 carbon atoms be 1-butene, 1-hexene, or 1-octene, and it is more preferable that the α-olefin having 4 to 12 carbon atoms be 1-butene.

For example, the component (I-2) may be a random copolymer. Furthermore, for example, the component (II) may be a random copolymer.

Examples of the component (I-2) include a propylene-ethylene copolymer component, a propylene-1-butene copolymer component, a propylene-1-hexene copolymer component, a propylene-1-octene copolymer component, propylene-1-decene copolymer component, a propylene-ethylene-1-butene copolymer component, a propylene-ethylene-1-hexene copolymer component, a propylene-ethylene-1-octene copolymer component, and a propylene-ethylene-1-decene copolymer component. It is preferable that the component (I-2) be the propylene-ethylene copolymer component, the propylene-1-butene copolymer component, or the propylene-ethylene-1-butene copolymer component.

It is preferable that the component (I) be a propylene homopolymer component, a propylene-ethylene copolymer component, a propylene-1-butene copolymer component, or a propylene-ethylene-1-butene copolymer component.

Examples of the component (II) include an ethylene-propylene copolymer component, an ethylene-propylene-1-butene copolymer component, an ethylene-propylene-1-hexene copolymer component, an ethylene-propylene-1-octene copolymer component, an ethylene-1-butene copolymer component, an ethylene-1-hexene copolymer component, an ethylene-1-octene copolymer component, and the like. It is preferable that the component (II) be the ethylene-propylene copolymer component, the ethylene-1-butene copolymer component, or the ethylene-1-octene copolymer component, and it is more preferable that the component (II) be the ethylene-propylene copolymer component.

In the case where the component (I) of the heterophasic propylene polymerization material is the component (I-1), examples of the polymerization material include a (propylene)-(ethylene-propylene) heterophasic polymerization material, a (propylene)-(ethylene-propylene-1-butene) heterophasic polymerization material, a (propylene)-(ethylene-propylene-1-octene) heterophasic polymerization material, a (propylene)-(ethylene-1-butene) heterophasic polymerization material, and a (propylene)-(ethylene-1-octene) heterophasic polymerization material.

In the case where the component (I) of the heterophasic propylene polymerization material is the component (I-2), examples of the polymerization material include a (propylene-ethylene)-(ethylene-propylene) heterophasic polymerization material, a (propylene-ethylene)-(ethylene-propylene-1-butene) heterophasic polymerization material, a (propylene-ethylene)-(ethylene-propylene-1-octene) heterophasic polymerization material, a (propylene-ethylene)-(ethylene-1-butene) heterophasic polymerization material, and a (propylene-ethylene)-(ethylene-1-octene) heterophasic polymerization material.

It is preferable that the heterophasic propylene polymerization material be the (propylene)-(ethylene-propylene) heterophasic polymerization material, the (propylene)-(ethylene-propylene-1-butene) heterophasic polymerization material, the (propylene)-(ethylene-1-butene) heterophasic polymerization material, the (propylene)-(ethylene-1-octene) heterophasic polymerization material, the (propylene-ethylene)-(ethylene-propylene) heterophasic polymerization material, the (propylene-ethylene)-(ethylene-propylene-1-butene) heterophasic polymerization material, the (propylene-ethylene)-(ethylene-1-butene) heterophasic polymerization material, or the (propylene-ethylene)-(ethylene-1-octene) heterophasic polymerization material. It is more preferable that that the heterophasic propylene polymerization material be the (propylene)-(ethylene-propylene) heterophasic polymerization material or the (propylene-ethylene)-(ethylene-propylene) heterophasic polymerization material.

The heterophasic propylene polymerization material according to the present invention is a heterophasic propylene polymerization material satisfying features (i) to (v).

<Feature (i)>

The heterophasic propylene polymerization material contains a xylene-soluble content by 20 wt % or more, provided that the total weight of the heterophasic propylene polymerization material is 100 wt %. In order to more effectively reduce the flow-mark occurring area with a smaller amount of the heterophasic propylene polymerization material to add, it is preferable that the xylene-soluble content be not less than 22 wt % but not more than 45 wt %.

In this Description, the "xylene-soluble content" is a 25° C. xylene-soluble content obtainable under ISO 16152 by using p-xylene as a solvent.

The amount of the xylene-soluble content in heterophasic propylene polymerization material can be controlled by adjusting a polymerization temperature, polymerization pressure, or residence time in polymerizing the component (II). The polymerization temperature is preferably in a range of 50 to 100° C. The polymerization pressure is preferably in a range of an ambient pressure to 3 MPaG. The residence time is preferably in a range of 0.5 to 5 hours.

<Feature (ii)>

The xylene-soluble content in the heterophasic propylene polymerization material has a limiting viscosity $[\eta]_{CXS}$ preferably not less than 5 dL/g but not more than 20 dL/g, more preferably not less than 5 dL/g but not more than 15 dL/g, or further more preferably not less than 5 L/d but not more than 12 dL/g.

The limiting viscosity in the present invention is a limiting viscosity measured at 135° C. in tetralin, and worked out according to the calculation method described on page 491 of "Kobunshi Youeki, Kobunshi Jicckengaku 11" (Polymer solutions, polymer experiments 11) (published in 1982 from KYORITSU SHUPPAN CO., LTD). That is, the limiting viscosity is a viscosity worked out by extrapolation based on plotting of reduction viscosity against concentration and extrapolating to zero concentration. The reduction viscosity is measured at 135° C. by using a tetralin solvent by using a Ubbelohde-type viscometer at three points of 0.1 g/dL, 0.2 g/dL, and 0.5 g/dL concentrations.

The limiting viscosity $[\eta]_{CXS}$ of the xylene-soluble content in the heterophasic propylene polymerization material can be controlled by adjusting a hydrogen concentration of a gas phase in a polymerization vessel in polymerizing the component (II). For example, the hydrogen concentration of the gas phase in the polymerization vessel is preferably in a range of 0.0 to 0.4 mol %, or more preferably in a range of 0.0 to 0.1 mol %, provided that a sum of ethylene, α-olefin, and hydrogen is 100 mol %.

<Feature (iii)>

The MFR of the component (I-1) or (I-2) is 70 g/10 min or more.

The MFR of the component (I-1) or (I-2) is preferably not less than 70 g/10 min but not more than 1000 g/10 min, more preferably not less than 100 g/10 min but not more than 500 g/10 min, or further more preferably not less than 120 g/10 min but not more than 300 g/10 min. The MFR of the component (I-1) or (I-2) can be controlled by adjusting a hydrogen concentration in a gas phase in a polymerization vessel in polymerizing the component (I-1) or (I-2). For example, the hydrogen concentration of the gas phase in the polymerization vessel is preferably in a range of 1 to 30 mol %, or more preferably in a range of 3 to 30 mol %, provided that a sum of propylene and hydrogen is 100 mol %.

<Feature (iv)>

The MFR of the heterophasic propylene polymerization material is preferably not less than 5 g/10 min but not more than 50 g/10 min, more preferably not less than 5 g/10 min but not more than 25 g/50 min, or further more preferably not less than 5 g/10 min but not more than 20 g/10 min.

The MFR of the heterophasic propylene polymerization material can be controlled by adjusting the hydrogen concentration in the gas phase in the polymerization vessel in polymerizing the component (I-1) or (I-2), or by adjusting the polymerization temperature, the polymerization pressure, the residence time, or the hydrogen concentration of the gas phase in the polymerization vessel in polymerizing the component (II). It is preferable that the hydrogen concentration in the gas phase in the polymerization vessel in polymerizing the component (I-1) or (I-2), and the polymerization temperature, the polymerization pressure, the residence time, or the hydrogen concentration of the gas phase in the polymerization vessel in polymerizing the component (II) be values within the ranges as described in the features (i) to (iii).

<Feature (v)>

The number of gels of 100 μm or more in diameter on a sheet for counting gels, including the heterophasic propylene polymerization material, is 1000 or less per 100 cm² of the sheet.

Sheet for counting gels: The sheet is prepared by mixing 0.05 parts by weight of a neutralizer and 0.2 parts by weight of an anti-oxidant with 100 parts by weight of the heterophasic propylene polymerization material, so as to obtain a mixture, pelletizing the mixture by melt-extrusion at a setting temperature of 280° C. and an extrusion rate of 10 kg/hr by using a 40 mm granulator equipped with a screen pack of 100 mesh, so as to obtain resin pellets. Melt-extruding the pellets thus obtained at a resin temperature of 230° C. into a sheet shape by using a single-screwed extruder with a screw diameter of 20 mm, so as to obtain a sheet-shaped product thus melt-extruded, and cooling the sheet shaped product on a cooling roll through which cooling water of 30° C. is passed, so as to obtain the sheet of 50 μm in thickness.

Examples of the pellets for use in molding a sheet for counting the number of gels include ones prepared as below, for example. Into 100 parts by weight of the heterophasic propylene polymerization material, 0.05 parts by weight of calcium stearate (made by NOF CORPORATION), and 0.1 parts by weight of 3,9-bis[2-{3-(3-tert-butyl-4-hydroxy-5-methylphenyl)propionyloxy}-1,1-dimethylethyl]-2,4,8,10-tetraoxaspiro[5.5]undecane (SUMILIZER (registered trademark) GA80, made by Sumitomo Chemical Co., Ltd.), and 0.1 parts by weight of 2,4,8,10-tetra-tert-butyl-6-[3-(3-methyl-4-hydroxy-5-tert-butylphenyl)propoxy]dibenzo[d,f][1,3,2]dioxaphosphepin (SUMILIZER (registered trademark) GP, made by Sumitomo Chemical Co., Ltd.) are mixed. A mixture thus prepared is melt-extruded at a setting temperature of 280° C. at an extrusion rate of 10 kg/hr by using a 40 mm granulator (made by TANABE PLASTICS MACHINERY CO., LTD.) equipped with a screen pack of 100 mesh, thereby pelletizing the mixture into pellets.

The number of gels per 100 cm² of the sheet is preferably in a range of 0 to 1000 (inclusive), or more preferably in a range of 0 to 750 (inclusive).

In the feature (v), the number of the gels is measured by the following method.

The surface of the sheet is observed and pictured under a scanner GT-X970 made by Seiko Epson Corp, thereby obtaining an image of the surface of the sheet. The image thus obtained is imported to a computer with 900 dpi resolution and 8 bit data size, and binary-treated by distinguishing portions with a threshold of 120 or more as white and portions with a threshold of less than 120 as black. The binary treatment is carried out by using an image analysis software "A-zokun" made by Asahi Engineering Co., Ltd. The white portions are considered as gels. Because the gels are indefinite in shape, equivalent circle diameters of the gels are considered as sizes thereof. Gels with equivalent circle diameters of 100 μm or more per 100 cm² of the sheet are counted.

The feature (v) can be satisfied by polymerizing the component (I-1) or (I-2) through a multi-staged polymerization later described. It is preferable that the multi-staged polymerization have 6 to 10 reactions regions in the case of the polymerization of the component (I).

The heterophasic propylene polymerization material contains the compound (I) preferably by not less than 50 wt % but not more than 80 wt %, or more preferably by not less than 55 wt % but not more than 80 wt %, provided that the total weight of the heterophasic propylene polymerization material is 100 wt %.

The heterophasic propylene polymerization material contains the compound (II) preferably by not less than 20 wt % but not more than 50 wt %, or more preferably by not less than 20 wt % but not more than 45 wt %, provided that the total weight of the heterophasic propylene polymerization material is 100 wt %.

The limiting viscosity $[\eta]_{whole}$ of heterophasic propylene polymerization material is preferably not less than 1 dL/g but not more than 10 dL/g, more preferably not less than 1.2 dL/g but not more than 8 dL/g, or further more preferably not less than 1.5 dL/g but not more than 5 dL/g, where the limiting viscosity $[\eta]_{whole}$ is measured at 135° C. in tetralin.

A limiting viscosity $[\eta]_{CXIS}$ of a xylene-insoluble content in the heterophasic propylene polymerization material is preferably not less than 0.8 dL/g but not more than 3.0 dL/g, or more preferably not less than 1.0 dL/g but not more than 2.5 dL/g.

The xylene-soluble content in the heterophasic propylene polymerization material contains the monomer units derived from ethylene and α-olefins having 4 to 12 carbon atoms preferably by not less than 10 wt % but not more than 75 wt %, more preferably not less than 15 wt % but not more than 60 wt %, or further more preferably not less than 20 wt % but more than 40 wt %, provided that the total weight of the xylene-soluble content is 100 wt %.

The heterophasic propylene polymerization material may contain phthalic ester in such a way that an amount of phthalic ester contained in the heterophasic propylene polymerization material is preferably not more than 1000 ppm by weight, more preferably not more than 10 ppm by weight, or further more preferably not more than 1 ppm by weight. It is preferable that the heterophasic propylene polymerization material according to the present invention contain phthalic ester by 0 ppm by weight, that is, contain no phthalic ester. A heterophasic propylene polymerization material containing phthalic ester by not more than 10 ppm by weight can be obtained by polymerizing propylene and the other ingredients in a presence of a polymerization catalyst not containing phthalic ester.

Examples of phthalic ester include dimethyl phthalate, diethyl phthalate, dipropyl phthalate, diisopropyl phthalate, diisobutyl phthalate, dinormal-butyl phthalate, ditertiary-butyl phthalate, dipentyl phthalate, dihexyl phthalate, dioctyl phthalate, dimethyl isophthalate, diethyl isophthalate, dipropyl isophthalate, dibutyl isophthalate, dipentyl isophthalate, dihexyl isophthalate, dioctyl isophthalate, dimethyl terephthalate, diethyl terephthalate, dipropyl terephthalate, dibutyl terephthalate, dipentyl terephthalate, dihexyl terephthalate, and dioctyl terephthalate.

<Manufacturing Method for Heterophasic Propylene Polymerization Material>

In the case where the heterophasic propylene polymerization material according to the present invention is a heterophasic propylene polymerization material containing the component (I-1) and the component (II), examples of manufacturing methods for the heterophasic propylene polymerization material include the following methods.

<Manufacturing Method 1>

Manufacturing Method for a heterophasic propylene polymerization material, including Step (1-1) and Step (1-2) below.

Step (1-1): in a presence of a propylene polymerization catalyst, performing multi-staged polymerization to homopolymerize propylene, thereby obtaining the component (I-1);

Step (1-2): in a presence of the component (I-1) thus produced, performing multi-staged polymerization to copolymerize at least one olefin selected from the group consisting of propylene and α-olefins having 4 to 12 carbon atoms, and ethylene, thereby obtaining a heterophasic propylene polymerization material containing the component (I-1) and the component (II).

<Manufacturing Method 2>

Manufacturing Method for a heterophasic propylene polymerization material, including Step (2-1) and Step (2-2) below.

Step (2-1): in a presence of the propylene polymerization catalyst thus produced, performing multi-staged polymerization to copolymerize at least one olefin selected from the group consisting of propylene and α-olefins having 4 to 12 carbon atoms, and ethylene, thereby obtaining the component (II).

Step (2-2): in a presence of the component (II) thus produced, performing multi-staged polymerization to homopolymerize propylene, thereby obtaining a heterophasic propylene polymerization material containing the component (I-1) and the component (II).

In the case where the heterophasic propylene polymerization material according to the present invention is a heterophasic propylene polymerization material containing the component (I-2) and the component (II), examples of manufacturing methods for the heterophasic propylene polymerization material include the following methods.

<Manufacturing Method 3>

Manufacturing Method for a heterophasic propylene polymerization material, including Step (3-1) and Step (3-2) below.

Step (3-1): in a presence of the propylene polymerization catalyst thus produced, performing multi-staged polymerization to copolymerize at least one olefin selected from the group consisting of ethylene and α-olefins having 4 to 12 carbon atoms, and propylene, thereby obtaining the component (I-2).

Step (3-2): in a presence of the component (I-2) thus produced, performing multi-staged polymerization to copolymerize at least one olefin selected from the group consisting of propylene and α-olefins having 4 to 12 carbon atoms, and ethylene, thereby obtaining a heterophasic propylene polymerization material containing the component (I-2) and the component (II).

<Manufacturing Method 4>

Manufacturing Method for a heterophasic propylene polymerization material, including Step (4-1) and Step (4-2) below.

Step (4-1): in a presence of the propylene polymerization catalyst thus produced, performing multi-staged polymerization to copolymerize at least one olefin selected from the group consisting of propylene and α-olefins having 4 to 12 carbon atoms, and ethylene, thereby obtaining the component (II).

Step (4-2): in a presence of the component (II) thus produced, performing multi-staged polymerization to copolymerize at least one olefin selected from the group consisting of ethylene and α-olefins having 4 to 12 carbon atoms, and propylene, thereby obtaining a heterophasic propylene polymerization material containing the component (I-2) and the component (II).

The multi-staged polymerization is a polymerization method in which monomers are polymerized in a presence of a polymerization catalyst through a plurality of reaction regions cascaded in series, and which includes the following steps a to c:

Step a for supplying a polymerization catalyst and a monomer(s) in a first reaction region uppermost in the cascade, and polymerizing the monomer(s), thereby obtaining a polymer;

Step b for transferring the polymer obtained in the first reaction region to a second reaction region connected to the first reaction region; and Step c for supplying a monomer(s) to the second reaction region, and polymerizing the monomer(s) in the presence of the polymer obtained in the first reaction region, thereby obtaining a polymer.

In the case where there are 3 or more reaction regions cascaded in series, steps corresponding to Step b and Step c are carried out for a third reaction region or for third and later reaction regions.

Examples of how to carry out the multi-staged polymerization include:

a case where the multi-staged polymerization is carried out in a system where a plurality of reactions vessels are cascaded in series, each reactor having one reaction region;

a case where the multi-staged polymerization is carried out in a reactor having a plurality of reaction regions; and a case where the multi-staged polymerization is carried out in a system where a reactor having one reaction region, and a reactor having a plurality of reaction regions are connected.

Examples of the reactor having a plurality of reaction regions include multi-staged spouted-bed reactors.

For Step (1-1), Step (2-2), Step (3-1), or Step (4-2), it is preferable that the multi-staged polymerization have 6 to 10 reaction regions. For Step (1-2), Step (2-1), Step (3-2), or Step (4-1), it is preferable that the multi-staged polymerization have 2 to 5 reaction regions.

It is preferable that Step (1-2), Step (2-1), Step (3-2), or Step (4-1) be carried out under such a condition that the hydrogen concentration of the gas phase in the polymerization vessel is in a range of 0.0 to 0.4 mol %, provided that the sum of ethylene, α-olefins, and hydrogen is 100 mol %. It is more preferable that this hydrogen concentration be in a range of 0.0 to 0.1 mol %.

In the manufacturing method for the heterophasic propylene polymerization material according to the present invention, propylene polymerization catalysts listed below are preferably usable.

In one embodiment, a propylene polymerization catalyst may be prepared by contacting a solid catalyst component and an organic aluminum compound with each other by a well-known method. The propylene polymerization catalyst thus prepared may sometimes contain the solid catalyst component and the organic aluminum compound.

In another embodiment, a propylene polymerization catalyst may be prepared by contacting a solid catalyst component, an organic aluminum compound, and an external electron donor with each other. The propylene polymerization catalyst thus prepared may sometimes contain the solid catalyst component, the organic aluminum compound, and the external electron donor.

As the solid catalyst component, solid catalyst components as described below are preferably usable:

Solid catalyst components containing at least one internal electron donor selected from the group consisting of monoester compounds, dicarboxylic ester compounds, diol ester compounds, β-alcoxyester compounds, and diether compounds, and a titanium atom, a magnesium atom, and a halogen atom, and satisfying the features (I) to (IV).

(I) having a total pore volume in a range of 0.95 to 1.80 mL/g, where the total pore volume is measured by the mercury intrusion technique under Standard ISO 15901-1: 2005, and a specific surface area in a range of 60 to 170 m$^2$/g, where the specific surface area is measured by the mercury intrusion technique under Standard ISO 15901-1: 2005;

(II) having such a particle size distribution that cumulative percentage of particles of 10 μm or less is 6.5% or less, where the particle size distribution is on a basis of volume measurement by the laser light scattering method under Standard ISO 13320:2009;

(III) having a ratio G/F of 0.33 or less, where F is an area of peaks of binding energy having a peak top in a range of 532 eV (inclusive) to 534 eV (inclusive), and G is an area of peaks of binding energy having a peak top in a range of 529 eV (inclusive) to 532 eV (not inclusive), where peaks are obtained by waveform separation of peaks of the is orbit of oxygen atoms observed in X-ray photoelectron spectroscopy under Standard ISO 15472:2001; and (IV) having titanium atom content in a range of 1.50 to 3.40 wt %.

The solid catalyst component can be produced by the following producing method.

A method for producing a solid catalyst component, including Step (I) contacting a titanium halide compound solution and a magnesium compound with each other, thereby obtaining a dispersion containing a solid product, the titanium halide compound solution containing a titanium halide compound and a solvent, and Step (I) being such that the ratio (A/C) of A represented by the following formula (1) to C represented by the following formula (2) is 3 or less, where $$A = a/b \qquad (1)$$

(where a is a volume (mL) of the titanium halide compound contained in the titanium halide compound solution, and b is a volume (mL) of the solvent contained in the titanium halide compound solution), and $$C = a/c \qquad (2)$$

(where a is a volume (mL) of the titanium halide compound contained in the titanium halide compound solution, and c is a volume (mL) of the solvent contained in the dispersion containing the solid product.)

The titanium halide compound means a compound that contains a halogen atom(s) and a titanium atom(s) in such a way that at least one halogen atom is bound to a titanium atom. The magnesium compound can be any compound containing a magnesium atom(s).

The internal electron donor is an organic compound that is capable of donating an electron pair(s) to one or more metal atoms contained in the solid catalyst, and specific examples of the internal electron donor include monoester compounds, dicarboxylic ester compounds, diol diester compounds, β-alkoxyester compounds, and diether compounds.

The monoester compounds mean organic compounds having one ester bond (—CO—O—) in their molecules, and aromatic carboxylic ester compounds or aliphatic carboxylic ester compounds are preferable. Examples of such aromatic carboxylic ester compounds include methyl benzoate, ethyl benzoate, propyl benzoate, butyl benzoate, pentyl benzoate, hexyl benzoate, octyl benzoate, methyl toluate, ethyl toluate, propyl toluate, butyl toluate, pentyl toluate, hexyl toluate, octyl toluate, and the like. Examples of the aliphatic carboxylic ester compounds include methyl acetate, ethyl acetate, propyl acetate, butyl acetate, pentyl acetate, hexyl acetate, octyl acetate, methyl propionate, ethyl propionate, propyl propionate, butyl propionate, pentyl propionate, hexyl propionate, octyl propionate, methyl butyrate, ethyl butyrate, propyl butyrate, butyl butyrate, pentyl butyrate, hexyl butyrate, octyl butyrate, methyl valerate, ethyl valerate, propyl valerate, butyl valerate, pentyl valerate, hexyl valerate, octyl valerate, methyl caproate, ethyl caproate, propyl caproate, butyl caproate, pentyl caproate, hexyl caproate, octyl caproate, methyl enanthate, ethyl enanthate, propyl enanthate, butyl enanthate, pentyl enanthate, hexyl enanthate, octyl enanthate, methyl caprylate, ethyl caprylate, propyl caprylate, butyl caprylate, pentyl caprylate, hexyl caprylate, octyl caprylate, methyl pelargonate, ethyl pelargonate, propyl pelargonate, butyl pelargonate, pentyl pelargonate, hexyl pelargonate, octyl pelargonate, methyl caprate, ethyl caprate, propyl caprate, butyl caprate, pentyl caprate, hexyl caprate, octyl caprate, methyl laurate, ethyl laurate, propyl laurate, butyl laurate, pentyl laurate, hexyl laurate, octyl laurate, methyl myristate, ethyl myristate, propyl myristate, butyl myristate, pentyl myristate, hexyl myristate, octyl myristate, methyl palmitate, ethyl palmitate, propyl palmitate, butyl palmitate, pentyl palmitate, hexyl palmitate, octyl palmitate, methyl margarate, ethyl margarate, propyl margarate, butyl margarate, pentyl margarate, hexyl margarate, octyl margarate, methyl stearate, ethyl stearate, propyl stearate, butyl stearate, pentyl stearate, hexyl stearate, and octyl stearate.

The dicarboxylic ester compounds mean compounds having two ester bonds (—CO—O—) in their molecules, and having a structure in which two carboxyl groups are esterified with a monovalent alcohol. Aromatic dicarboxylic ester compounds or aliphatic dicarboxylic ester compounds are preferable. Examples of the aromatic dicarboxylic ester compounds include compounds that can be synthesized from an aromatic dicarboxylic acid or aromatic dicarboxylic dihalide, and a monovalent alcohol. Specific examples of the aromatic dicarboxylic ester compounds include dimethyl phthalate, diethyl phthalate, dipropyl phthalate, diisopropyl phthalate, diisobutyl phthalate, dinormal-butyl phthalate, ditertiary-butyl phthalate, dipentyl phthalate, dihexyl phthalate, dioctyl phthalate, dimethyl isophthalate, diethyl isophthalate, dipropyl isophthalate, dibutyl isophthalate, dipentyl isophthalate, dihexyl isophthalate, dioctyl isophthalate, dimethyl terephthalate, diethyl terephthalate, dipropyl terephthalate, dibutyl terephthalate, dipentyl terephthalate, dihexyl terephthalate, and dioctyl terephthalate. Examples of the aliphatic dicarboxylic ester compounds include compounds that can be synthesized from an aliphatic dicarboxylic acid or aliphatic dicarboxylic dihalide, and a monovalent alcohol. Specific examples of the aliphatic dicarboxylic ester compounds include dimethyl ethanedioate, diethyl ethanedioate, dipropyl ethanedioate, dibutyl ethanedioate, dipentyl ethanedioate, dihexyl ethanedioate, dioctyl ethanedioate, dimethyl propanedioate, diethyl propanedioate, dipropyl propanedioate, dibutyl propanedioate, dipentyl propanedioate, dihexyl propanedioate, dioctyl propanedioate, dimethyl butanedioate, diethyl butanedioate, dipropyl butanedioate, dibutyl butanedioate, dipentyl butanedioate, dihexyl butanedioate, dioctyl butanedioate, dimethyl pentanedioate, diethyl pentanedioate, dipropyl pentanedioate, dibutyl pentanedioate, dipentyl pentanedioate, dihexyl pentanedioate, dioctyl pentanedioate, dimethyl hexanedioate, diethyl hexanedioate, dipropyl hexanedioate, dibutyl hexanedioate, dipentyl hexanedioate, dihexyl hexanedioate, dioctyl hexanedioate, dimethyl (E)-but-2-enediate, dimethyl (E)-but-2-enediate, dipropyl (E)-but-2-enediate, dibutyl (E)-but-2-enediate, dipentyl (E)-but-2-enediate, dihexyl (E)-but-2-enediate, dioctyl (E)-but-2-enediate, dimethyl (Z)-but-2-enediate, diethyl (Z)-but-2-enediate, dipropyl (Z)-but-2-enediate, dibutyl (Z)-but-2-enediate, dipentyl (Z)-but-2-enediate, dihexyl (Z)-but-2-enediate, dioctyl (Z)-but-2-enediate, methyl cyclohexane-1,2-dicarboxylate, ethyl cyclohexane-1,2-dicarboxylate, propyl cyclohexane-1,2-dicarboxylate, butyl cyclohexane-1,2-dicarboxylate, pentyl cyclohexane-1,2-dicarboxylate, hexyl cyclohexane-1,2-dicarboxylate, octyl cyclohexane-1,2-dicarboxylate, methyl 1,2-cyclohexene-1,2-dicarboxylate, ethyl 1,2-cyclohexene-1,2-dicarboxylate, propyl 1,2-cyclohexene-1,2-dicarboxylate, butyl 1,2-cyclohexene-1,2-dicarboxylate, pentyl 1,2-cyclohexene-1,2-dicarboxylate, hexyl 1,2-cyclohexene-1,2-dicarboxylate, octyl 1,2-cyclohexene-1,2-dicarboxylate, methyl 3-methyl cyclohexane-1,2-dicarboxylate, ethyl 3-methyl cyclohexane-1,2-dicarboxylate, propyl 3-methyl cyclohexane-1,2-dicarboxylate, butyl 3-methyl cyclohexane-1,2-dicarboxylate, pentyl 3-methyl cyclohexane-1,2-dicarboxylate, hexyl 3-methyl cyclohexane-1,2-dicarboxylate, octyl 3-methyl cyclohexane-1,2-dicarboxylate, methyl 3,6-dimethyl cyclohexane-1,2-dicarboxylate, ethyl 3,6-dimethyl cyclohexane-1,2-dicarboxylate, propyl 3,6-dimethyl cyclohexane-1,2-dicarboxylate, butyl 3,6-dimethyl cyclohexane-1,2-dicarboxylate, pentyl 3,6-dimethyl cyclohexane-1,2-dicarboxylate, hexyl 3,6-dimethyl cyclohexane-1,2-dicarboxylate, and octyl 3,6-dimethyl cyclohexane-1,2-dicarboxylate.

The diol diester compounds are compounds having two ester bonds (—CO—O—) in their molecules, and having such a structure that each of two hydroxyl groups of diol esterifies a carboxyl group of monocarboxylic acid or dicarboxylic acid. Specific examples of the diol diester compounds include 1,2-dibenzoate propane, 1,2-diacetyloxypropane, 1,2-dibenzoate butane, 1,2-diacetyloxybutane, 1,2-dibenzoate cyclohexane, 1,2-diacetyloxy-cyclohexane, 1,3-dibenzoate propane, 1,3-diacetyloxy propane, 2,4-dibenzoate pentane, 2,4-acetyloxy pentane, 1,2-dibenzoate cyclopentane, 1,2-diacetyloxycyclopentane, 1,2-dibenzoate-4-tert-butyl-6-methylbenzene, 1,2-diacetyloxy-4-tert-butyl-6-methylbenzene, 1,3-dibenzoate-4-tert-butyl-6-methylbenzene, and 1,3-diacetyloxy-4-tert-butyl-6-methylbenzene.

The β-alkoxyester compounds mean compounds having an alkoxycarbonyl group and an alkoxy group at the β site of the alkoxycarbonyl group. More specific examples of the β-alkoxyester compounds include methyl 2-methoxymethyl-3,3-dimethyl butanoate, ethyl 2-methoxymethyl-3,3-dimethyl butanoate, propyl 2-methoxymethyl-3,3-dimethyl butanoate, butyl 2-methoxymethyl-3,3-dimethyl butanoate, pentyl 2-methoxymethyl-3,3-dimethyl butanoate, hexyl 2-methoxymethyl-3,3-dimethyl butanoate, octyl 2-methoxymethyl-3,3-dimethyl butanoate, methyl 3-methoxy-2-phenyl propionate, ethyl 3-methoxy-2-phenyl propionate, propyl 3-methoxy-2-phenyl propionate, butyl 3-methoxy-2-phenyl propionate, pentyl 3-methoxy-2-phenyl propionate, hexyl 3-methoxy-2-phenyl propionate, octyl 3-methoxy-2-phenyl propionate, methyl 2-ethoxymethyl-3,3-dimethyl butanoate, ethyl 2-ethoxymethyl-3,3-dimethyl butanoate, propyl 2-ethoxymethyl-3,3-dimethyl butanoate, butyl 2-ethoxymethyl-3,3-dimethyl butanoate, pentyl 2-ethoxymethyl-3,3-dimethyl butanoate, hexyl 2-ethoxymethyl-3,3-dimethyl butanoate, octyl 2-ethoxymethyl-3,3-dimethyl butanoate, methyl 3-ethoxy-2-phenyl propionate, ethyl 3-ethoxy-2-phenyl propionate, propyl 3-ethoxy-2-phenyl propionate, butyl 3-ethoxy-2-phenyl propionate, pentyl 3-ethoxy-2-phenyl propionate, hexyl 3-ethoxy-2-phenyl propionate, octyl 3-ethoxy-2-phenyl propionate, methyl 2-propyloxymethyl-3,3-dimethyl butanoate, ethyl 2-propyloxymethyl-3,3-dimethyl butanoate, propyl 2-propyloxymethyl-3,3-dimethyl butanoate, butyl 2-propyloxymethyl-3,3-dimethyl butanoate, pentyl 2-propyloxymethyl-3,3-dimethyl butanoate, hexyl 2-propyloxymethyl-3,3-dimethyl butanoate, octyl 2-propyloxymethyl-3,3-dimethyl butanoate, methyl 3-propyloxy-2-phenyl propionate, ethyl 3-propyloxy-2-phenyl propionate, propyl 3-propyloxy-2-phenyl propionate, butyl 3-propyloxy-2-phenyl propionate, pentyl 3-propyloxy-2-phenyl propionate, hexyl 3-propyloxy-2-phenyl propionate, octyl 3-propyloxy-2-phenyl propionate, methyl 2-methoxybenzene carboxylate, ethyl 2-methoxybenzene carboxylate, propyl 2-methoxybenzene carboxylate, butyl 2-methoxybenzene carboxylate, pentyl 2-methoxybenzene carboxylate, hexyl 2-methoxybenzene carboxylate, octyl 2-methoxybenzene carboxylate, methyl 2-ethoxybenzene carboxylate, ethyl 2-ethoxybenzene carboxylate, propyl 2-ethoxybenzene carboxylate, butyl 2-ethoxybenzene carboxylate, pentyl 2-ethoxybenzene carboxylate, hexyl 2-ethoxybenzene carboxylate, and octyl 2-ethoxybenzene carboxylate.

The diether compounds mean compounds having two ether bonds in their molecules. Specific examples of the diether compounds include 1,2-dimethoxypropane, 1,2-diethoxypropane, 1,2-dipropyloxypropane, 1,2-dibutoxypropane, 1,2-di-tert-butoxypropane, 1,2-diphenoxypropane, 1,2-dibenzyloxypropane, 1,2-methoxybutane, 1,2-ethoxybutane, 1,2-dipropyloxybutane, 1,2-dibutoxybutane, 1,2-di-tert-butoxybutane, 1,2-diphenoxybutane, 1,2-dibenzyloxybutane, 1,2-dimethoxycyclohexane, 1,2-ethoxycyclohexane, 1,2-dipropyloxycyclohexane, 1,2-dibutoxycyclohexane, 1,2-di-tert-butoxycyclohexane, 1,2-diphenoxycyclohexane, 1,2-dibenzyloxycyclohexane, 1,3-dimethoxypropane, 1,3-diethoxypropane, 1,3-dipropyloxypropane, 1,3-dibutoxypropane, 1,3-di-tert-butoxypropane, 1,3-diphenoxypropane, 1,3-dibenzyloxypropane, 2,4-dimethoxypentane, 2,4-diethoxypentane, 2,4-dipropyloxypentane, 2,4-dibutoxypentane, 2,4-di-tert-butoxypentane, 2,4-diphenoxypentane, 2,4-dibenzyloxypentane, 1,2-dimethoxycyclopentane, 1,2-diethoxycyclopentane, 1,2-dipropyloxycyclopentane, 1,2-dibutoxycyclopentane, 1,2-di-tert-butoxycyclopentane, 1,2-diphenoxycyclopentane, 1,2-dibenzyloxycyclopentane, 9,9-bis(methoxymethyl)fluorene, 9,9-bis(ethoxymethyl)fluorene, 9,9-bis(propyloxymethyl)fluorene, 9,9-bis(butoxymethyl)fluorene, 9,9-bis-tert-butoxymethyl fluorene, 9,9-bis(phenoxymethyl)fluorene, 9,9-bis(benzyloxymethyl)fluorene, 1,2-dimethoxybenzene, 1,2-diethoxybenzene, 1,2-dipropyloxybenzene, 1,2-dibutoxybenzene, 1,2-di-tert-butoxybenzene, 1,2-diphenoxybenzene, and 1,2-dibenzyloxybenzene.

Examples of the inner electron donor include an inner electron donor described in JP-A-2011-246699.

It is preferable that the inner electron donor be at least one inner electron donor selected from the group consisting of dicarboxylic ester compounds, diol diester compounds, and β-alkoxyester compounds. The inner electron donors may be used solely, or two or more of the inner electron donors may be used in combination.

The organic aluminum compounds mean compounds having at least one carbon-aluminum bond, and specific examples of the organic aluminum compounds include a compound described in JP-A-10-212319. It is preferable that the organic aluminum compound be a trialkylaluminum, a mixture of a trialkylaluminum and a dialkylaluminum halide, or an alkylalumoxane. It is more preferable that the organic aluminum compound be triethylaluminum, triisobutylaluminum, a mixture of triethylaluminum and diethylaluminum chloride, or tetraethyldialumoxane.

Examples of the external electron donor include compounds described in JP-B2-2950168, and JP-A-2006-96936, JP-A-2009-173870, and JP-A-2010-168545. The external electron donor is preferably an oxygen-containing compound or a nitrogen-containing compound. Examples of the oxygen-containing compound include alkoxy silicones, ethers, esters, and ketones. It is preferable that the oxygen-containing compound be an alkoxy silicone or an ether. It is more preferable that the oxygen-containing compound be cyclohexylmethyldimethoxysilane, cyclohexylethyldimethoxysilane, diisopropyldimethoxysilane, tert-butylethyldimethoxysilane, tert-butyl-n-propyldimethoxysilane, phenyltrimethoxysilane, diphenyldimethoxysilane, dicyclobutyldimethoxysilane, dicyclopentyldimethoxysilane, tetraethoxysilane, methyltriethoxysilane, ethyltriethoxysilane, isobutyltriethoxysilane, vinyltriethoxysilane, sec-butyltriethoxysilane, cyclohexyltriethoxysilane, or cyclopentyltriethoxysilane.

It is preferable that the solvent contained in a titanium halide compound solution be an inert hydrocarbon such as propane, butane, isobutane, pentane, isopentane, hexane, heptane, octane, cyclohexane, benzene, toluene, or the like.

The manufacturing method for the heterophasic propylene polymerization material may include polymerizing a small amount of olefin in a presence of the solid catalyst component and the organic aluminum compound, so as to produce a catalyst component whose surface is covered with a polymer of the olefin (this polymerization is usually referred to as preliminary polymerization, and thus the catalyst component is usually referred to as preliminary polymerization catalyst component). The olefin used in the preliminary polymerization is at least one of the olefin(s) constituting the heterophasic propylene polymerization material. The preliminary polymerization may include adjusting a molecular weight of the polymer of the olefin by using a chain transfer agent such as hydrogen, or using an external electron donor.

In one embodiment, the preliminary polymerization is such that an amount of the organic aluminum compound to be contained is preferably in a range of 0.1 to 700 mol, or preferably 0.2 to 200 mol per one mole of a transition metal atom contained in the solid catalyst component. An amount of the external electron donor to be contained is preferably in a range of 0.01 to 400 mol per one mole of the transition metal atom contained in the solid catalyst component. The solid catalyst component contained per 1 L of the solvent is preferably in a range of 1 to 500 g. Usually, an amount of the olefin for the preliminary polymerization is in a range of 0.1 to 200 g per 1 g of the solid catalyst component.

One embodiment may be arranged such that the component (I) is produced through multi-staged polymerization, and the component (II) is produced through multi-staged polymerization.

The component (I) may be produced by a method including, for example:
polymerizing propylene in a later-described vessel-type reactor in a presence of the propylene polymer catalyst; and
polymerizing propylene in a later-described gas-phase reactor in a presence of a propylene polymer thus produced in the vessel-type reactor.

The vessel-type reactor usually has one reaction region. For example, a polymerization temperature in the vessel-type reactor may be in a range of 0 to 120° C. For example, a polymerization pressure in the vessel-type reactor may be in a range of ambient pressure to 10 MPaG.

The gas-phase reactor for producing the component (I) may be a gas-phase reactor having 5 to 9 reaction regions. Examples of the gas-phase reactor include a spouted-bed reactor and a gas-phase reactor having a fluidized-bed reaction region and a spouted-bed reaction region. For example, a polymerization temperature in the gas-phase reactor is preferably in a range of 40 to 80° C., or more preferably in a range of 50 to 70° C. For example, a polymerization pressure in the gas-phase reactor is preferably in a range of an ambient pressure to 10 MPaG, or more preferably in a range of an ambient pressure to 5 MPaG.

The component (II) may be produced by a method including performing multi-staged polymerization in the gas-phase in a presence of the component (I-1) so as to copolymerize ethylene and at least one olefin selected from the group consisting of propylene and α-olefins having 4 to 12 carbon atoms.

In producing component (II), for example, a polymerization temperature is preferably in a range of 0 to 120° C., or more preferably in a range of 50 to 100° C. In producing the component (II), for example, a polymerization pressure is preferably in a range of ambient pressure to 10 MPaG, or more preferably in a range of an ambient pressure to 3 MPaG. In producing the component (II), for example, a hydrogen concentration in the polymerization vessel is preferably in a range of 0.0 to 0.4 mol %, or more preferably in a range of 0.0 to 0.1 mol %.

The heterophasic propylene polymerization material according to the present invention is applicable as a polypropylene modifier.

In this Description, the "polypropylene modifier" is a material for improving outer appearance of a polypropylene-containing molded product. For example, the outer appearance of the polypropylene-containing molded product containing the heterophasic propylene polymerization material according to the present invention serving as the polypropylene modifier is better than that of a polypropylene-containing molded product not containing such a polypropylene modifier.

The polypropylene modifier may contain an additive such as a heat-resistant stabilizer, a ultra-violet light stabilizer, an anti-oxidant, a neutralizer, a crystal nucleating material, a lubricant, an anti-blocking agent, an antistatic agent, an antifog agent, a flame retardant, a petroleum resin, a foaming agent, a foaming auxiliary agent, or the like.

For example, the polypropylene modifier may be such a polypropylene modifier that contains, as active constituents, the heterophasic propylene polymerization material containing the component (I-1) or (I-2), and the component (II), the heterophasic propylene polymerization material satisfying the features (i) to (iv), and the polypropylene modifier satisfying a later-described feature (v).

(v) the number of gels of 100 μm or more in diameter on a sheet for counting gels is 1000 or less per 100 cm² of the sheet.

Sheet for counting gels: The sheet is prepared by pelletizing the polypropylene modifier by melt-extrusion at a setting temperature of 280° C. and an extrusion rate of 10 kg/hr by using a 40 mm granulator equipped with a screen pack of 100 mesh, so as to obtain pellets, melt-extruding the pellets thus obtained at a resin temperature of 230° C. into a sheet shape by using a single-screwed extruder with a screw diameter of 20 mm, so as to obtain a sheet-shaped product thus melt-extruded, and cooling the sheet shaped product on a cooling roll through which cooling water of 30° C. is passed, so as to obtain the sheet of 50 μm in thickness.

The polypropylene modifier may further contain an anti-oxidant in addition to the heterophasic propylene polymerization material. The polypropylene modifier may contain a neutralizer by not less than 0 parts by weight but not more than 1 part by weight, and an anti-oxidant by not less than 0 parts by weight but not less than 1 part by weight in 100 parts by weight of the heterophasic propylene polymerization material.

Examples of the anti-oxidant include a phenolic anti-oxidant and a phosphorus anti-oxidant.

More specifically, with a configuration where 100 parts by weight of a propylene-based resin composition contains 1 to 10 parts by weight of the heterophasic propylene polymerization material according to the present invention, it becomes possible to reduce the flow-mark occurring area on an injection-molded product thus obtained.

<Propylene-Based Resin Composition>

The present invention provides a propylene-based resin composition including a heterophasic propylene polymerization material, a component (A), a component (B), and a component (C), the propylene-based resin composition containing the heterophasic propylene polymerization material by 1 to 10 wt %, the component (A) by 30 to 97 wt %, the component (B) by 1 to 30 wt %, and the component (C) by 1 to 30 wt %, where a sum of the heterophasic propylene polymerization material, the component (A), the component (B), and the component (C) is 100 wt %.

It is preferable that the propylene-based resin composition contain the heterophasic propylene polymerization material by 1 to 5 wt %.

It is preferable that the propylene-based resin composition contain a component (A) by 35 to 97 wt %.

It is preferable that the propylene-based resin composition contain a component (B) by 1 to 25 wt %.

It is preferable that the propylene-based resin composition contain a component (C) by 1 to 25 wt %.

It is preferable that a sum of the heterophasic propylene polymerization material, the component (A), the component (B), and the component (C) be 70 wt % or more per 100 parts by weight of a total weight of the propylene-based resin composition.

<Component (A)>

The component (A) is a polymer having a propylene-based monomer unit, and containing the propylene-based monomer unit by 50 wt % or more, with respect to 100 wt % of a total weight of the polymer.

Examples of the component (A) include propylene homopolymer, propylene-α-olefin copolymer, and a heterophasic propylene polymerization material, provided that a polymer (X) as defined below is excluded from the heterophasic propylene polymerization material serving as the component (A):

Polymer (X): a heterophasic propylene polymerization material containing the component (I-1) or (I-2), and the composition (II), and satisfying the following features (i) to (v).

(i) The heterophasic propylene polymerization material contains a xylene-soluble content by 20 wt % or more, provided that a total weight of the heterophasic propylene polymerization material is 100 wt %.

(ii) Xylene-soluble content in the heterophasic propylene polymerization material has a limiting viscosity $[\eta]_{CXS}$ not less than 5 dL/g.

(iii) the MFR of the component (I-1) or (I-2) is not less than 70 g/10 min.

(iv) MFR of the heterophasic propylene polymerization material is not less than 5 g/10 min.

(v) the number of gels of 100 μm or more in diameter on a sheet for counting gels obtained from the heterophasic propylene polymerization material is 1000 or less per 100 cm² of the sheet.

Sheet for counting gels: The sheet is prepared by mixing 0.05 parts by weight of a neutralizer and 0.2 parts by weight of an anti-oxidant with 100 parts by weight of the heterophasic propylene polymerization material, so as to obtain a mixture, pelletizing the mixture by melt-extrusion at a setting temperature of 280° C. and an extrusion rate of 10 kg/hr by using a 40 mm granulator equipped with a screen pack of 100 mesh, so as to obtain pellets, melt-extruding the pellets thus obtained at a resin temperature of 230° C. into a sheet shape by using a single-screwed extruder with a screw diameter of 20 mm, so as to obtain a sheet-shaped product thus melt-extruded, and cooling the sheet shaped product on a cooling roll through which cooling water of 30° C. is passed, so as to obtain the sheet of 50 μm in thickness.

The propylene-based resin composition according to the present invention may contain one kind of the component (A) or two or more kinds of the components (A). It is preferable that the component (A) is a propylene homopolymer or a heterophasic propylene polymerization material.

<Component (B)>

An olefin-based elastomer is a polymer containing a monomer unit derived from a $C_3$ to $C_{20}$ α-olefin and a monomer unit derived from ethylene. It is preferable that the olefin-based elastomer contain the monomer unit derived from ethylene by 10 to 85 wt %, provided that a total weight of the component (B) is 100 wt %. Examples of the $C_3$ to $C_{20}$ α-olefin include propylene, 1-butene, isobutene, 1-pentene, 2-methyl-1-butene, 3-methyl-1-butene, 1-hexene, 2-methyl-1-pentene, 3-methyl-1-pentene, 4-methyl-1-pentene, 1-octene, 1-nonene, 1-decene, 1-undecene, 1-dodecene, and the like. It is preferable that the $C_3$ to $C_{20}$ α-olefin be propylene, 1-butene, 1-hexene, or 1-octene.

Examples of the olefin-based elastomer include ethylene-propylene copolymer elastomer, ethylene-1-butene copolymer elastomer, ethylene-1-hexene copolymer elastomer, ethylene-1-octene copolymer elastomer, and the like. The olefin-based elastomer may be used solely or two or more of them may be used in combination. It is preferable that the olefin-based elastomer be ethylene-1-butene copolymer elastomer or ethylene-1-octene copolymer elastomer.

<Component (C)>

Examples of the component (C) include talc, mica, montmorillonite, wollastonite, zinc oxide, calcium carbonate, magnesium carbonate, potassium titanate, basic magnesium sulfate, glass fibers, carbon fibers, and aramid fibers. It is preferable that the component (C) be talc. The propylene-based resin composition according to the present invention may contain one kind of the component (C) or two or more kinds of the components (C).

The propylene-based resin composition according to the present invention may contain an additive such as a heat-resistant stabilizer, a ultra-violet light stabilizer, an antioxidant, a neutralizer, a crystal enucleating material, a lubricant, an anti-blocking agent, an antistatic agent, an antifog agent, a flame retardant, a petroleum resin, a foaming agent, a foaming auxiliary agent, or the like, if necessary. An amount of the additive is preferably not less than 0.01 wt % but not more than 30 wt %, where the total weight of the propylene-based resin composition is 100 wt %. The propylene-based resin composition may contain one kind of the additive or two or more kinds of the additive at a ratio selected as appropriate.

Examples of the manufacturing method for the propylene-based resin composition according to the present invention include a method inducing melt-mixing the heterophasic propylene polymerization material, the component (A), the component (B), the component (C), and optionally the additive added thereto if necessary. The melt-mixing may be carried out by using a Bumbary mixer, a single-screwed extruder, a double-screwed extruder in which two screws rotate in a same direction, or the like. The melt-mixing is carried out usually at a temperature in a range of 170 to 250° C. for a time period in a range of 1 to 20 min. Furthermore, the melt-mixing may mix these ingredients at the same time or separately.

In the case where the additive is added, examples of the melt-mixing include (1) a method for melt-mixing the heterophasic propylene polymerization material, the component (A), the component (B), and the additive, and after that, melt-mixing a mixture thus prepared and the component (C) added therein and, (2) a method for melt-mixing the heterophasic propylene polymerization material, the component (A), the component (B), and the component (C) in advance, and after that, melt-mixing a mixture thus prepared and the additive added therein.

For example, the propylene-based resin composition is applicable to manufacturing a molded product by the following method.

Examples of the manufacturing method for the molded product include a manufacturing method including melting the propylene-based resin composition, and molding the propylene-based resin composition, thereby obtaining a molded product.

Examples of a molding method include extrusion molding, and injection molding. For example, the extrusion molding can produce a molded product in a sheet shape. The injection molding can produce an injection-molded product.

Examples of the injection molding include general injection molding, injection foam molding, supercritical injection foam molding, super high-speed injection molding, injection compression molding, gas-assist injection molding, sandwich molding, sandwich foam molding, and insert/outsert moldings.

Examples will be described below to explain the embodiments of the present inventions in detail.

EXAMPLES

Measurements of various items in Examples and Comparative Examples were measured by the following methods.

(1) Limiting Viscosity ([η], Unit: dL/g)

The limiting viscosity $[\eta]_{whole}$ of the whole heterophasic propylene polymerization material and the limiting viscosity ($[\eta]_{CXS}$) of the xylene-soluble content in the heterophasic propylene polymerization material By using a Ubbelohde-type viscometer, reduction viscosities of the heterophasic propylene polymerization material and the xylene-soluble component in the heterophasic propylene polymerization material were measured at three points of 0.1 g/dL, 0.2 g/dL, and 0.5 g/dL concentrations. The limiting viscosities were worked out according to the calculation method described on page 491 of the reference literature "Kobunshi Youeki, Kobunshi Jicckengaku 11" (Polymer solutions, polymer experiments 11) (published in 1982 from KYORITSU SHUPPAN CO., LTD), that is, worked out by extrapolation based on plotting of reduction viscosity against concentration and extrapolating to zero concentration. The measurement was carried out at 135° C. by using tetralin as a solvent.

(2) Xylene-Soluble Content (CXS, Unit: Wt %)

By using p-xylene as a solvent, a 25° C. xylene-soluble content was prepared according to ISO 16152.

(3) Melt Flow Rate (MFR, Unit: g/10 Min)

MFR was measured at 230° C. with a load of 2.16 kgf according to the method stipulated under JIS K7210 A.

(4) Production of Sheets for Counting Number of Gels

The sheets for counting the number of gels were prepared as below. By using a single-screwed extruder with a screw diameter of 20 mm (VS20-14 made by TANABE PLASTICS MACHINERY CO., LTD.), a raw material was melt-extruded at a resin temperature of 230° C. into a sheet shape, and a sheet-shaped product thus melt-extruded was cooled on a cooling roll through which cooling water of 30° C. was passed, thereby preparing a sheet of 50 μm in thickness.

(5) Number of Gels on Sheet of Heterophasic Propylene Polymerization Material (Unit: Number of Gels/100 $cm^2$)

The heterophasic propylene polymerization material was molded by the method described in (4), and a surface of the sheet thus prepared was observed and pictured under Scanner GT-X970 made by Seiko-Epson, thereby obtaining an image of the surface of the sheet. The image thus obtained was imported to a computer with 900 dpi resolution and 8 bit data size, and binary-treated by distinguishing portions with a threshold of 120 or more as white and portions with a threshold of less than 120 as black. The binary treatment was carried out by using an image analysis software "A-zokun" made by Asahi Engineering Co., Ltd. The white portions were considered as gels. Because the gels were indefinite in shape, equivalent circle diameters of the gels were considered as sizes thereof. Gels with equivalent circle diameters of 100 μm or more per 100 $cm^2$ of the sheet were counted.

(6) Number of Gels on Sheet of Propylene-Based Resin Composition (Unit: Number of Gels/100 $cm^2$)

The propylene-based resin composition was molded by the method described in (4), and a surface of a sheet thus prepared was visually observed to count the number of gels of 200 μm or more in diameter per 100 $cm^2$ of the sheet.

(7) Production of Injection-Molded Product for Evaluation Regarding Flow-Mark Occurring Starting Positions Injection-molded products as test pieces for evaluation regarding flow-mark occurring starting positions were prepared as below. By using, as an injection molding device, SE180D of Sumitomo Heavy Industries, Ltd. with a clamping capacity of 180 ton, and, a mold of one-point gate with a cavity size of 100 mm×400 mm×3.0 mm (thickness), injection-molding was carried out with a molding temperature of 220° C., a mold temperature of 50° C., an injection time of 15 sec, and a cooling time of 30 sec.

(8) Flow-Mark Occurring Starting Positions

Flow mark occurring starting positions on the injection-molded products thus prepared by the method described in (7) were visually observed. As illustrated in FIG. 1, a distance (unit: mm) from a gate edge surface 1 to a position from which a flow mark 2 started was measured. Note that the arrow in the drawing indicates a direction of injection into the mold. With a longer distance from the gate edge surface 1 to the flow mark 2 starting, the flow-mark occurring area on the injection-molded product was smaller, thereby giving better outer appearance.

Reference Example: Production of Solid Catalyst Component

Step (1-1A): Inside of a 100-ml flask equipped with a stirring device, a titration funnel, and a thermometer was purged with nitrogen. After that, 36.0 mL of toluene and 22.5 mL of titanium tetrachloride were introduced and stirred in the flask. After bringing the temperature inside the flask to 0° C., 1.88 g of magnesium ethoxide was introduced 4 times with 30 min intervals, and the content is the flask was stirred for 1.5 hours. After that, 0.60 mL of ethyl 2-ethoxymethyl-3,3-dimethyl butanoate was introduced in the flask, after which the temperature of the flask was increased to 10° C. After that, stirring was carried out at this temperature for 2 hours, and 9.8 mL of toluene was introduced. After that, the temperature inside the flask was increased at a rate of 1.2 K/min, and when the temperature reached 60° C., 3.15 mL of ethyl 2-ethoxymethyl-3,3-dimethyl butanoate was introduced. After that, the temperature inside the flask was increased to 110° C. The content in the flask was stirred at this temperature for 3 hours, thereby obtaining a mixture. The mixture was subjected to solid-liquid separation, thereby obtaining solid. The solid was washed at 100° C. with 56.3 mL of toluene 3 times.

Step (1-1B): To the solid after the washing, 38.3 mL of toluene was introduced, thereby forming a slurry. To the slurry, 15.0 mL of titanium tetrachloride and 0.75 mL of ethyl 2-ethoxymethyl-3,3-dimethyl butanoate were introduced, thereby obtaining a mixture, and the mixture was stirred at 110° C. for 1 hour. After that, the mixture thus stirred was subjected to solid-liquid separation, and resultant solid was washed at 60° C. with 56.3 mL of toluene 3 times, and further washed at a room temperature with 56.3 mL of hexane three times. The solid after the washing was dried under reduced pressure, thereby obtaining a solid catalyst component.

The solid catalyst component was such that titanium atom content was 2.53 wt %, ethoxy group content was 0.44 wt %, and internal electron donor content was 13.7 wt %.

Furthermore, the solid catalyst component was such that a median particle size was 59.5 μm measured by the laser light scattering method, and had such a particle size distribution that cumulative percentage of particles of 10 μm or less was 5.3% where the particle size distribution was on the basis of volume. The solid catalyst component had a ratio G/F of 0.176, where F is an area of peaks of binding energy having a peak top in a range of 532 eV (inclusive) to 534 eV (inclusive), and G is an area of peaks of binding energy having a peak top in a range of 529 eV (inclusive) to 532 eV (not inclusive), where peaks were obtained by waveform separation of peaks of the is orbit of oxygen atoms observed in the X-ray photoelectron spectroscopy. The solid catalyst component had a total pore volume of 1.434 mL/g, and pore volume of pores whose radius was in a range of 2 to 50 nm was 0.283 mL/g where the total pore volume was measured by the mercury intrusion technique.

Example 1: Production of Heterophasic Propylene Polymerization Material (BCPP-1)

(1-1a) Preliminary Polymerization

Into an autoclave (SUS) with an internal volume of 3 L and a stirring device, 0.8 L of n-hexane, 20 mmol of triethyl aluminum (hereinafter, referred to as "TEA"), and 0.4 mmol of tert-butyl-n-propyldimethoxysilane, which had been sufficiently dehydrated and deaerated, were added. After 8.1 g of the solid catalyst component thus prepared in the reference example was added thereto, preliminary polymerization was carried out, while keeping the temperature inside the autoclave substantially at 10° C. and continuously supplying 8.1 g of propylene thereto over approximately 30 min. After that, a preliminary polymerization slurry thus obtained was transferred into an autoclave (SUS 316L) with an internal volume of 260 L and a stirring device, and 135 g of liquid butane was added thereto, thereby preparing a slurry of preliminary polymerization catalyst component.

(1-1b) Polymerization

In a device in which all of a slurry polymerization reactor, a multi-staged gas phase polymerization rector, and two spouted-bed reactors were cascaded in series, a component (I) was produced via polymerization Step I and Polymerization Step II described below, and transferred to a downstream reactor without inactivating a polymer thus produced, and a component (II) was produced via Polymerization Step III-1 and Polymerization Step 111-2.

[Polymerization Step I (Propylene Homopolymerization in Slurry Polymerization Reactor)]

By using the slurry polymerization reactor of vessel type (SUS304) equipped with a stirring device, propylene homopolymerization was carried out. That is, polymerization was carried out with propylene, hydrogen, TEA, and tert-butyl-n-propyldimethoxysilane and the slurry of the preliminary polymerization catalyst component thus prepared in Step (1-1a) supplied to the slurry polymerization reactor continuously, thereby obtaining a slurry containing polypropylene particles and liquid propylene. The reaction was carried out under the following conditions.

Polymerization Temperature: 55° C.
Stirring Speed: 150 rpm
Liquid Level in Reactor: 18 L
Supplying Rate of Propylene: 11 kg/hour
Supplying Rate of Hydrogen: 39.9 NL/hour
Supplying Rate of TEA: 24.3 mmol/hour
Supplying Rate of tert-butyl-n-propyldimethoxysilane: 1.21 mmol/hour
Supplying Rate of Slurry of Preliminary Polymerization Catalyst Component (based on Solid Catalyst Component): 0.51 g/hour
Polymerization Pressure: 3.10 MPa (Gauge Pressure)

[Polymerization Step II (Propylene Homopolymerization (Gas Phase Polymerization) in Multi-Staged Gas Phase Polymerization Reactor)]

A multi-staged gas phase polymerization reactor was provided, the multi-staged gas phase polymerization reactor having 6 stages of reaction regions vertically aligned, an uppermost stage of which was of fluidized-bed type, and the remaining 5 stages of which were of spouted-bed type.

From the slurry polymerization reactor, the slurry containing the polypropylene particles and the liquid propylene was continuously supplied to the fluidized-bed type uppermost stage of the multi-staged gas phase polymerization reactor without inactivating the slurry.

Transfer of the polypropylene particles between the stages inside the multi-staged gas phase polymerization reactor was carried out by a double-valve method, in which an upstream reaction region and a downstream reaction region were connected via a 1-inch sized pipe equipped with two on-off valves, and an upstream one of the two on-off valves was opened while a downstream one of the two on-off valves was closed to introduce the polypropylene particles between the two on-off valves from the upstream reaction region, and thereafter, the downstream one of the two on-off valves was open after the upstream one of the two on-off valves was closed to transfer the polypropylene particles into the downstream reaction region.

From a lower part of the multi-staged gas phase polymerization reactor configured as above, propylene and hydrogen were continuously supplied. While, with this configuration, the fluidized bed and the spouted beds were formed in the corresponding reaction regions, and the supplying rates of propylene and hydrogen were controlled in such a way as to maintain gas composition and pressure, purging excess from the multi-staged gas phase polymerization reactor. The reaction was carried out under the following conditions.

Polymerization Temperature: 70° C.
Polymerization Pressure: 1.80 MPa (Gauge Pressure)
In this reactor, a gas concentration ratio (hydrogen/(hydrogen+propylene)) was 11.3 mol %.

[Polymerization Step III-1 (Propylene-Ethylene Copolymerization (Gas Phase Polymerization in Spouted-Bed Reactor (1))]

The polypropylene particles discharged from the multi-staged gas phase polymerization reactor were continuously supplied to a spouted-bed reactor. The spouted-bed reactor in Polymerization Step III-1 had two stages of spouted-bed reaction regions aligned vertically. The polypropylene particles were transferred from the multi-staged gas phase polymerization reactor to the spouted-bed reactor (1) by the double-valve method as described above.

While continuously supplying propylene, ethylene, and hydrogen into the spouted-bed reactor configured as above, and maintaining gas composition and pressure by controlling the supplying rates of the gases and by purging excess gas, copolymerization of propylene and ethylene was carried out in the presence of polypropylene particles. The reaction was carried out under the following conditions.

Polymerization Temperature: 70° C.
Polymerization Pressure: 1.77 MPa (Gauge Pressure)
Gas concentration ratios in this reactor were such that ethylene/(hydrogen+propylene+ethylene) was 20.3 mol %, and hydrogen/(hydrogen+propylene+ethylene) was 0.07 mol %.

[Polymerization Step 111-2 (Propylene-Ethylene Copolymerization (Gas Phase Polymerization in Spouted-Bed Reactor (2))]

The polypropylene particles discharged from the spouted-bed rector (1) in Polymerization Step III-1 were further supplied to a downstream spouted-bed reactor (2) continuously. The spouted-bed reactor (2) in Polymerization Step 111-2 had one state of spouted-bed reaction region aligned vertically, and the polypropylene particles were transferred from the spouted-bed reactor (1) in Polymerization Step III-1 to the spouted-bed reactor (2) in Polymerization Step 111-2 by the double-valve method.

The copolymerization of propylene and ethylene was carried out in a similar manner to that in Polymerization Step III-1 except the following conditions, thereby obtaining a heterophasic propylene polymerization material.

Polymerization Temperature: 70° C.
Polymerization Pressure: 1.74 MPa (Gauge Pressure)
In the reactor, gas concentration ratios in this reactor were such that ethylene/(hydrogen+propylene+ethylene) was 21.3 mol %, and hydrogen/(hydrogen+propylene+ethylene) was 0.01 mol %.

Content (X) of the component (II) in the heterophasic propylene polymerization material thus obtained was worked out by measuring respective crystal melting heat amounts of the component (I) and the whole heterophasic propylene polymerization material, and calculating the following equation. The crystal melting heat amounts were measured by differential scanning calorimetry (DSC).

$$X = 1 - (\Delta Hf)T/(\Delta Hf)P$$

($\Delta Hf$)T: Melting heat amount of the whole heterophasic propylene polymerization material (unit: J/g)
($\Delta Hf$)P: Melting heat amount of the component (I) (unit: J/g)

Examples 2 and 3: Productions of Heterophasic Propylene Polymerization Materials (BCPP-2) and (BCPP-3)

The productions in Examples 2 and 3 were carried out in a similar manner to that in Example 1, except the values listed on Table 1.

TABLE 1

|  |  |  | Example 1 | Example 2 | Example 3 |
|---|---|---|---|---|---|
| Preliminary polymerization | n-Hexane | L | 0.8 | 0.8 | 0.8 |
|  | TEA | mmol | 20 | 20 | 20 |
|  | Electron donor component | mmol | 0.4 | 0.4 | 0.4 |
|  | Solid catalyst component | g | 8.1 | 8.1 | 8.1 |
|  | Temperature | °C. | about 10 | about 10 | about 10 |
|  | Propylene | g | 8.1 | 8.1 | 8.1 |
|  | Liquid butane | g | 135 | 135 | 135 |
| Propylene polymer component (I) | | | | | |
| Polymerization 1st vessel | Polymerization temperature | °C. | 55 | 55 | 55 |
|  | Propylene supplying rate | kg/hr | 11 | 11 | 11 |
|  | Hydrogen supplying rate | NL/hr | 39.9 | 39.9 | 39.9 |
|  | TEA supplying rate | mmol/hr | 24.3 | 23.2 | 25.2 |
|  | Electron donor component supplying rate | mmol/hr | 1.21 | 0.94 | 1.25 |
|  | Solid catalyst component supplying rate | g/hr | 0.51 | 0.38 | 0.38 |
|  | Polymerization pressure | MPaG | 3.10 | 3.23 | 3.23 |
| Polymerization 2nd vessel | Polymerization temperature | °C. | 70 | 70 | 70 |
|  | Polymerization pressure | MPaG | 1.80 | 1.80 | 1.80 |
|  | Hydrogen concentration | mol % | 11.3 | 10.5 | 11.9 |
|  | Crystal melting heat amount | J/g | 108 | 107 | 108 |
| Ethylene-α-olefin copolymer component (II) | | | | | |
| Polymerization 3rd vessel | Polymerization temperature | °C. | 70 | 70 | 70 |
|  | Polymerization pressure | MPaG | 1.77 | 1.77 | 1.77 |
|  | Ethylene concentration | mol % | 20.3 | 22.6 | 22.6 |
|  | Hydrogen concentration | mol % | 0.07 | 0.05 | 0.06 |
|  | Residence time | hr | 1.3 | 1.2 | 1.0 |
| Polymerization 4th vessel | Polymerization temperature | °C. | 70 | 70 | 70 |
|  | Polymerization pressure | MPaG | 1.74 | 1.74 | 1.74 |
|  | Ethylene concentration | vol % | 21.3 | 22.8 | 23.1 |
|  | Hydrogen concentration | vol % | 0.01 | 0.01 | 0.01 |
|  | Residence time | hr | 0.7 | 0.6 | 0.5 |
|  | Residence time (total) | hr | 2.0 | 1.8 | 1.5 |
| Heterophasic propylene | Polymerization material |  | BCPP-1 | BCPP-2 | BCPP-3 |
|  | [η] whole | dL/g | 3.10 | 3.80 | 3.44 |
|  | Crystal melting heat amount | J/g | 74 | 72 | 77 |
|  | Ethylene-α-olefin copolymer component (II) content | wt % | 31.2 | 32.7 | 28.1 |

Production Example 1: Production of Heterophasic Propylene Polymerization Material (BCPP-4)

BCPP-4 was a polymerization material including components (I) and (II) and being prepared by multi-staged polymerization.

By using a polymerization catalyst obtained by the method described in Example 1 of JP-A-2004-182981, the component (I) was produced by the later-described Polymerization Step I and Polymerization Step II in a device in which a liquid-phase reactor and three vessels of a gas-phase reactor were cascaded in series. The component (I) was transferred to downstream without inactivating a polymer thus produced, and the component (II) was produced in later-described Polymerization Step III.

(1) Polymerization Step I

In a liquid-phase polymerization rector made by SUS and sufficiently purged with propylene, TEA and cyclohexylethyldimethoxysilane were supplied. Homopolymerization of propylene was carried out in a liquid phase at an internal temperature of the reactor adjusted to be in a range of 65 to 75° C., at an internal pressure (gauge pressure) in the reactor adjusted to 4.5 MPa by using propylene and hydrogen, while continuously supplying into the reactor the solid catalyst component synthesized by the method described in Example 1 of JP-A-2004-182981. A propylene homopolymer thus prepared was continuously transferred to a first vessel of the three vessels of the gas-phase polymerization reactor in the downstream.

(2) Polymerization Step II

At a polymerization temperature of 80° C. in the first vessel of the gas-phase polymerization reactor, while continuously supplying propylene to maintain a polymerization pressure (gauge pressure) of 2.1 MPa in the first vessel, and supplying hydrogen to maintain a hydrogen concentration in a gas phase, homopolymerization of propylene was carried out in the gas phase in a presence of the polypropylene homopolymer continuously transferred from the loop-type liquid-phase polymerization reactor. A propylene homopolymer component in the first vessel was intermittently transferred to a second vessel next in the cascade.

At a polymerization temperature of 80° C. in the second vessel of the gas-phase polymerization reactor, while continuously supplying propylene to maintain a polymerization pressure (gauge pressure) of 1.7 MPa in the second vessel, and hydrogen supply to maintain a hydrogen concentration in a gas phase, homopolymerization of propylene was carried out in the gas phase in a presence of the propylene homopolymer component intermittently transferred from the first vessel, thereby obtaining a component (I) substantially containing the propylene homopolymer component transferred from the first vessel and a propylene homopolymer component thus produced in the second vessel. The component (I) sampled from the second vessel had a melt flow rate of 250 g/min. A total amount of the component (I) was intermittently transferred to a third vessel next in the cascade.

(1) Polymerization Step III

At a polymerization temperature of 70° C. in the third vessel of the gas-phase polymerization reactor, while continuously supplying propylene to maintain a polymerization pressure (gauge pressure), and supplying hydrogen and ethylene to maintain a hydrogen concentration and ethylene concentration in a gas phase, copolymerization of propylene and ethylene was carried out in the gas phase in a presence of the polymer component (I) intermittently transferred from the second vessel, thereby obtaining a component (II).

A powdered polymer component in the third vessel was continuously transferred to a deactivation vessel, in which the catalyst component was deactivated with water. After that, the polymer component was dried with nitrogen of 80° C., thereby obtaining a heterophasic polymerization material (BCPP-4) substantially containing the component (I) and the component (II).

A heterophasic propylene polymerization material (BCPP-5) was X1956A made by LyondellBasell.

Into 100 parts by weight of the heterophasic propylene polymerization material, 0.05 parts by weight of calcium stearate (made by NOF CORPORATION), and 0.1 parts by weight of 3,9-bis[2-{3-(3-tert-butyl-4-hydroxy-5-methylphenyl)propionyloxy}-1,1-dimethylethyl]-2,4,8,10-tetraoxaspiro[5.5]undecane(GA80, made by Sumitomo Chemical Co., Ltd.), and 0.1 parts by weight of 2,4,8,10-tetra-tert-butyl-6-[3-(3-methyl-4-hydroxy-5-tert-butylphenyl)propoxy]dibenzo[d,f][1,3,2]dioxaphosphepin (SUMILIZER GP, made by Sumitomo Chemical Co., Ltd.) are mixed, then, melt-extruding at a setting temperature of 280° C. at an extrusion rate of 10 kg/hr by using a 40 mm granulator (made by TANABE PLASTICS MACHINERY CO., LTD.) equipped with a screen pack of 100 mesh, thereby pelletizing the mixture into pellets. Properties of the pellets of the heterophasic propylene polymerization materials thus prepared and evaluation results of the number of gels on sheets prepared from the heterophasic propylene polymerization materials are shown on Table 2.

TABLE 2

|  |  | BCPP-1 | BCPP-2 | BCPP-3 | BCPP-4 | BCPP-5 |
| --- | --- | --- | --- | --- | --- | --- |
| MFR of component (I) | g/10 min | 213 | 257 | 213 | 250 | — |
| MFR of heterophasic propylene polymerization material | g/10 min | 5.9 | 10.6 | 7.0 | 100.5 | 1.2 |
| Xylene-soluble content | wt % | 23.6 | 20.4 | 23.7 | 6.2 | 24.8 |
| $[\eta]_{cxs}$ | dL/g | 7.69 | 8.81 | 8.56 | 5.39 | 6.00 |
| Number of gels (100 μm or more) | per 100 cm² | 624 | 540 | 649 | 498 | 4131 |

(Polypropylene Modifier)

Into 100 parts by weight of the heterophasic propylene polymerization material, 0.05 parts by weight of calcium stearate (made by NOF CORPORATION), and 0.1 parts by weight of 3,9-bis[2-{3-(3-tert-butyl-4-hydroxy-5-methylphenyl)propionyloxy}-1,1-dimethylethyl]-2,4,8,10-tetraoxaspiro[5.5]undecane (GA80, made by Sumitomo Chemical Co., Ltd.), and 0.1 parts by weight of 2,4,8,10-tetra-tert-butyl-6-[3-(3-methyl-4-hydroxy-5-tert-butylphenyl)propoxy]dibenzo[d,f][1,3,2]dioxaphosphepin (SUMILIZER GP, made by Sumitomo Chemical Co., Ltd.) are mixed. After that, the mixture thus obtained was subjected to melt-extrusion at a setting temperature of 280° C. and an extrusion rate of 10 kg/hr by using a 40 mm granulator (made by TANABE PLASTICS MACHINERY CO., LTD.) equipped with a screen pack of 100 mesh, thereby obtaining pellets of a polypropylene modifier. Properties of the polypropylene modifiers thus obtained and evaluation results of the number of gals on sheets prepared from the polypropylene modifiers are shown on Table 3.

TABLE 3

|  |  | Modifier 1 | Modifier 2 | Modifier 3 | Modifier 4 | Modifier 5 |
| --- | --- | --- | --- | --- | --- | --- |
| MFR of component (I) | g/10 min | 213 | 257 | 213 | 250 | — |
| MFR of heterophasic propylene polymerization material | g/10 min | 5.9 | 10.6 | 7.0 | 100.5 | 1.2 |
| Xylene-soluble content | wt % | 23.6 | 20.4 | 23.7 | 6.2 | 24.8 |
| $[\eta]_{cxs}$ | dL/g | 7.69 | 8.81 | 8.56 | 5.39 | 6.00 |
| Number of gels (100 μm or more) | per 100 cm² | 624 | 540 | 649 | 498 | 4131 |

(1) Propylene-Based Polymer (A-1)
A propylene homopolymer having the following properties.
Limiting viscosity of 0.82 dl/g
(2) Propylene-Based Polymer (A-2)
A propylene homopolymer having the following properties.
Limiting viscosity of 0.51 dl/g
(3) Propylene-Based Polymer (A-3)
A (propylene)-(ethylene-propylene) heterophasic polymerization material having the following properties.
Limiting viscosity (propylene homopolymer component) 0.97 dl/g
Limiting viscosity (ethylene-propylene copolymer component) 2.24 dl/g
Ethylene content in ethylene-propylene copolymer 49 wt %
Ethylene-propylene copolymer component content 15 wt %
(4) Olefin-Based Elastomer (B-1)
An ethylene-1-octene random copolymer having the following properties
Density 0.857 g/cm$^3$
MFR (measured at 230° C. under load of 2.16 kg) 1.0 g/10 min
(5) Olefin-Based Elastomer (B-2)
An ethylene-1-octene random copolymer having the following properties
Density 0.863 g/cm$^3$
MFR (measured at 230° C. under load of 2.16 kg) 0.5 g/10 min
(6) Inorganic Filler (C-1)
Talc of 5 μm in volume average particle diameter Example 4

A mixture including BCPP-1 by 4.0 wt %, the component (A-1), which was a propylene-based polymer, by 8.0 wt %, the component (A-2), which was a propylene-based polymer, by 11.0 wt %, the component (A-3), which was a propylene-based polymer, by 33.5 wt %, the olefin-based elastomer (B-1) by 17.5 wt %, the olefin-based elastomer (B-2) by 5.0 wt %, and the inorganic filler (C) by 21.0 wt % was prepared, preliminarily mixed evenly by a tumbler, and subjected to mixing and kneading extrusion by using a double-screwed extruder (TEX44SS-30BW-2V made by The Japan Steel Works, LTD.) with an extrusion rate of 50 kg/hr, 230° C., and a screw rotating speed of 350 rpm), thereby obtaining a propylene-based resin composition. MFR of the propylene-based resin compositions thus prepared, flow-mark occurring starting positions of the injection-molded product, and evaluation results of outer appearances of an extruded sheet are shown on Table 4.

Examples 5 and 6

A similar process was carried out as Example 4 except that, instead of BCPP-1, BCPP-2 (Example 5) or BCPP-3 (Example 6) was used, thereby obtaining propylene-based resin compositions. MFR of the propylene-based resin compositions thus prepared, flow-mark occurring starting positions of the injection-molded product, and evaluation results of outer appearances of an extruded sheet are shown on Table 4.

Comparative Examples 1 and 2

A similar process was carried out as Example 4, using, instead of BCPP-1, BCPP-4 (Comparative Example 1) or BCPP-5 (Comparative Example 2), thereby obtaining propylene-based resin compositions having the composition shown in Table 3. MFR of the propylene-based resin compositions thus prepared, flow-mark occurring starting positions of the injection-molded product, and evaluation results of outer appearances of an extruded sheet are shown on Table 4.

Comparative Example 3

A similar process was carried out as Example 4 except that, the heterophasic polymerization material was not used, thereby obtaining propylene-based resin compositions having the composition shown in Table 3. MFR of the propylene-based resin compositions thus prepared, flow-mark occurring starting positions of the injection-molded product, and evaluation results of outer appearances of an extruded sheet are shown on Table 4.

TABLE 4

| | | Examples | | | Comparative example 1 | Comparative example 2 | Comparative example 3 |
|---|---|---|---|---|---|---|---|
| | | Example 4 | Example 5 | Example 6 | | | |
| Heterophasic Polymerization material | BCPP-1 | 4.0 | | | | | |
| | BCPP-2 | | 4.0 | | | | |
| | BCPP-3 | | | 4.0 | | | |
| | BCPP-4 | | | | 4.0 | | |
| | BCPP-5 | | | | | 4.0 | |
| Component (A-1) | PP-1 | 8.0 | 8.0 | 8.0 | 8.0 | 8.0 | 8.0 |
| Component (A-2) | PP-2 | 11.0 | 11.0 | 11.0 | 11.0 | 11.0 | 11.0 |
| Component (A-3) | PP-3 | 33.5 | 33.5 | 33.5 | 33.5 | 33.5 | 48.5 |
| Component (B-1) | EOR-1 | 17.5 | 17.5 | 17.5 | 17.5 | 17.5 | 17.5 |
| Component (B-2) | EOR-2 | 5.0 | 5.0 | 5.0 | 5.0 | 5.0 | 5.0 |
| Component (C) | Talc-1 | 21.0 | 21.0 | 21.0 | 21.0 | 21.0 | 21.0 |
| | Mg—St | 0.2 | 0.2 | 0.2 | 0.2 | 0.2 | 0.2 |
| MFR | g/10 min | 49 | 51 | 48 | 59 | 46 | 60 |
| Flow mark occurring Starting position | mm | 190 | 205 | 225 | 150 | 200 | 140 |
| Number of gels (200 μm or more) | per 100 cm$^2$ | 3 | 1 | 1 | 3 | 32 | — |

INDUSTRIAL APPLICABILITY

A heterophasic propylene polymerization material according to the present invention is applicable as a material for improving flow marks on propylene-based resin injection-molded products for automobile members such as interior parts and exterior parts of automobiles, for example.

The present application claims the priority based on Japanese patent application No. 2017-048151 (filed on Mar. 14, 2017), the entire content of which is incorporated herein by reference.

DESCRIPTION OF REFERENCE SIGNS

1 Gate edge surface
2 Flow-mark occurring starting position

The invention claimed is:

1. A propylene-based resin composition comprising a first heterophasic propylene polymerization material, a component (A), a component (B) and a component (C),
   wherein the first heterophasic propylene polymerization material is present in the propylene-based resin composition in an amount from 1 to 10 wt %, the component (A) is present in the propylene-based resin composition in an amount from 30 to 97 wt %, the component (B) is present in the propylene-based resin composition in an amount from 1 to 30 wt %, and the component (C) is present in the propylene-based resin composition in an amount from 1 to 30 wt %,
   wherein a sum of the first heterophasic propylene polymerization material, the component (A), the component (B), and the component (C) is 100 wt %,
   wherein the first heterophasic propylene polymerization material comprises a component (I-1) or a component (I-2), and a component (II),
   wherein the first heterophasic propylene polymerization material satisfies features (i) to (v):
   (i) the first heterophasic propylene polymerization material comprises a xylene-soluble content by 20 wt % or more based upon a total weight of the first heterophasic propylene polymerization material of 100 wt %;
   (ii) the xylene-soluble content in the first heterophasic propylene polymerization material has a limiting viscosity CXS not less than 5 dL/g;
   (iii) a melt flow rate of the component (I-1) or (I-2) is 70 g/10 min or more, wherein the melt flow rate is measured at 230° C. under load of 2.16 kgf;
   (iv) a melt flow rate of the first heterophasic propylene polymerization material is 5 g/10 min or more, wherein the melt flow rate is measured at 230° C. under load of 2.16 kgf; and
   (v) the number of gels of 100 μm or more in diameter on a sheet for counting gels is 1000 or less per 100 cm$^2$ of the sheet,
   wherein the sheet is prepared by mixing 0.05 parts by weight of a neutralizer and 0.2 parts by weight of an anti-oxidant with 100 parts by weight of the first heterophasic propylene polymerization material so as to obtain a mixture, pelletizing the mixture by melt-extrusion at a setting temperature of 280° C. and an extrusion rate of 10 kg/hr by using a 40 mm granulator equipped with a screen pack of 100 mesh so as to obtain pellets, melt-extruding the pellets thus obtained at a resin temperature of 230° C. into a sheet shape by using a single-screwed extruder with a screw diameter of 20 mm so as to obtain a sheet-shaped product thus melt-extruded, and cooling the sheet shaped product on a cooling roll through which cooling water at a temperature of 30° C. is passed so as to obtain the sheet of 50 μm in thickness,
   wherein the component (I-1) is a propylene homopolymer,
   the component (I-2) is a propylene copolymer component comprising a monomer unit derived from propylene and a monomer unit derived from at least one olefin selected from the group consisting of ethylene and α-olefins having 4 to 12 carbon atoms in an amount not less than 0.01 wt % but less than 20 wt % based upon a total weight of the component (I-2) of 100 wt %, and
   the component (II) is an ethylene-α-olefin copolymer component comprising a monomer unit derived from ethylene in an amount not less than 20 wt % but not more than 80 wt %, based upon a total weight of the component (II) of 100 wt %, and a monomer unit derived from at least one olefin selected from the group consisting of propylene and α-olefins having 4 to 12 carbon atoms,
   wherein the first heterophasic propylene polymerization material comprises component (I-1) or (I-2) by not less than 50 wt % but not more than 80 wt % and the component (II) by not less than 20 wt % but not more than 50 wt %, provided that the total weight of the heterophasic propylene polymerization material is 100 wt %,
   wherein the xylene-soluble content in the first heterophasic propylene polymerization material contains monomer units derived from ethylene and α-olefins having 4 to 12 carbon atoms by not less than 10 wt % but not more than 75 wt %, provided that the total weight of the xylene soluble content is 100 wt %,
   wherein the component (A) comprises a second heterophasic propylene polymerization material, provided that a polymer (X) is excluded from the second heterophasic propylene polymerization material serving as the component (A),
   wherein the polymer (X) is a heterophasic propylene polymerization material containing the component (I-1) or the component (I-2) and the component (II) and satisfying features (i) to (v),
   wherein the component (B) comprises at least one olefin-based elastomer selected from the group consisting of ethylene-1-butene copolymer elastomer and ethylene-1-octene copolymer elastomer, and
   wherein the component (C) is an inorganic filler.

2. The propylene-based resin composition according to claim 1, wherein the first heterophasic propylene polymerization material comprises a phthalic ester in an amount of 10 ppm or less.

* * * * *